United States Patent [19]

Guy

[11] Patent Number: 4,514,003
[45] Date of Patent: Apr. 30, 1985

[54] MOUNTING OF AUTOMOBILE TRIM STRIPS

[75] Inventor: Robert R. Guy, North Royalton, Ohio

[73] Assignee: LOF Plastics Inc., Detroit, Mich.

[21] Appl. No.: 301,778

[22] Filed: Sep. 14, 1981

[51] Int. Cl.³ .............................................. B62D 25/16
[52] U.S. Cl. .................................. 293/128; 280/153 B; 24/295
[58] Field of Search ............... 293/128 O; 280/153 R, 280/153 B; 24/259 R

[56] References Cited

U.S. PATENT DOCUMENTS

| | | | |
|---|---|---|---|
| 3,108,338 | 10/1963 | Stec et al. | 24/295 R |
| 3,439,950 | 4/1969 | Kunevicius | 293/128 |
| 4,174,850 | 11/1979 | Hart | 280/153 R |
| 4,215,873 | 8/1980 | Price | 280/153 R |

FOREIGN PATENT DOCUMENTS 732759  6/1955  United Kingdom ............ 280/153 B

*Primary Examiner*—Robert R. Song
*Attorney, Agent, or Firm*—Collins, Oberlin & Darr

[57] ABSTRACT

Securing a decorative and protective trim strip or molding along an exposed edge of an automotive vehicle body as, for example, an outline molding around a wheel well opening. A resilient strip having the desired decorative configuration and appearance is adhesively secured along the edge of the sheet material of the body, and spring clips having a cross sectional configuration complementary to that of the resilient strip are placed over the strip and flange of the sheet material in areas where excessive stress may occur, such as at least at the ends of the strip. The clips insure that the adhesive layer of the strip will remain in engagement with the vehicle without the necessity of fasteners piercing the sheet material.

2 Claims, 4 Drawing Figures

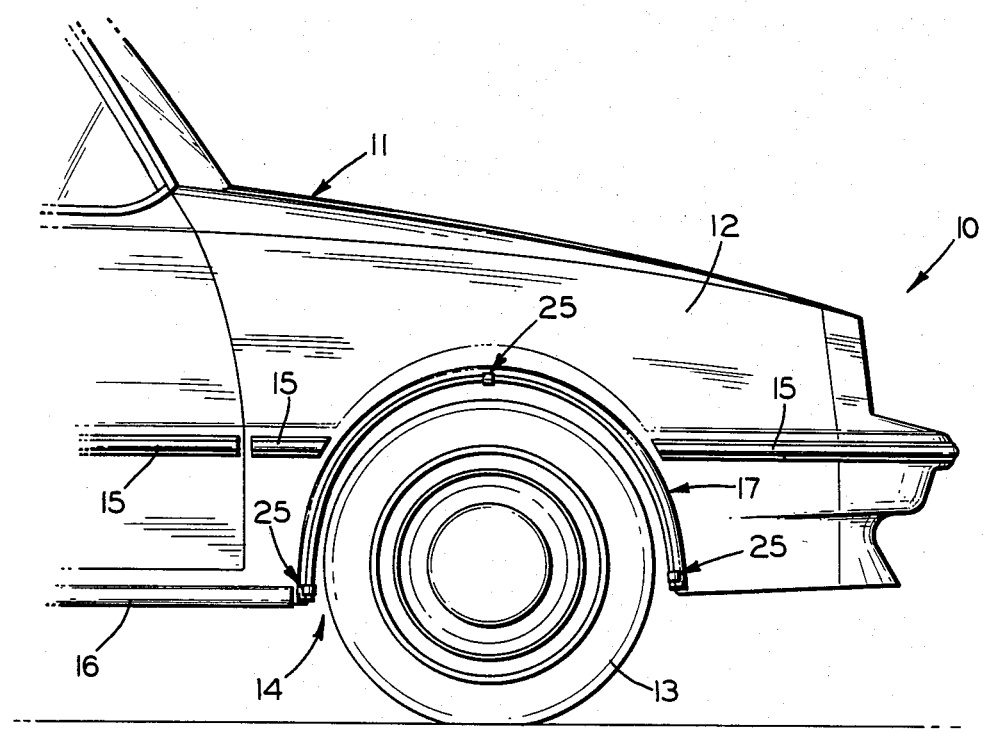
FIG. 1
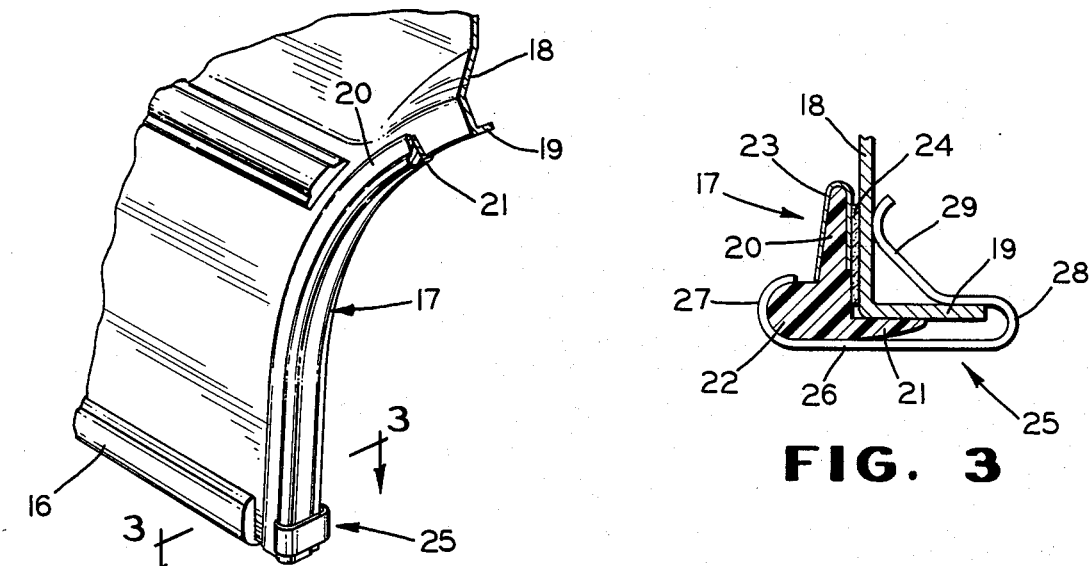
FIG. 2
FIG. 3
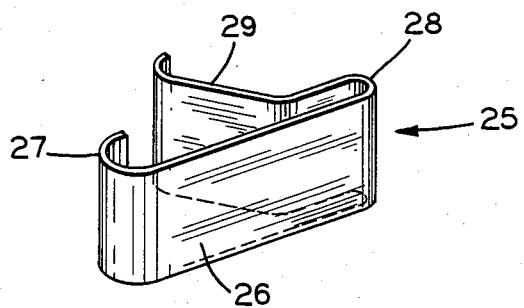
FIG. 4

MOUNTING OF AUTOMOBILE TRIM STRIPS

BACKGROUND OF THE INVENTION

1. Field of the Invention

This invention pertains to a decorative and protective molding strip for automobiles and the like, and more particularly to securement of such a strip along a free edge or corner of the sheet material from which the vehicle body is constructed.

2. Description of the Prior Art

The molding or trim strips of U.S. Pat. Nos. 3,439,950, 3,531,348 and 3,572,798 to Alex Kunevicius are representative of many such decorative and protective strips disclosed in the prior art. In recent years such resilient extruded members formed of various plastics have replaced the metallic strips formerly employed for this purpose. The strips originally were applied to the relatively flat surface areas of the vehicle and were affixed to the supporting surface as by means of various fasteners, by being inserted in a metal backing strip or by an adhesive layer affixed to their rear surface.

It has also been found desirable from both a decorative and a protective standpoint to outline the wheel openings, or so-called wheel wells, of a vehicle's fenders with a molding or trim strip. Due to the rather sharply curved path which such strips must follow and the conditions to which they are subjected, it has heretofore been deemed preferable to fabricate such outline moldings of metal and secure them in place by fasteners which penetrate the underlying sheet material, such as self-tapping screws. As is well known, any such fastener penetrating the sheet metal from which most vehicles are fabricated serves as a potential site for corrosion. The metal strips also tend to become dented and deformed so as to be unattractive after a period of time. For this reason, as well as the substantial savings in time and labor which could be realized, it has been felt that use of resilient, deformable, plastic strips of the general type disclosed in the aforementioned United States patents would be preferred in place of the conventional metal strips for this purpose. Nevertheless, due to the particular configuration of the opening which the strip must follow, it has not heretofore been deemed feasible to employ plastic members unless they were affixed to the underlying sheet metal with penetrating fasteners such as self-tapping screws. This would, of course, create potential sites for corrosion and at least partially defeat the purpose of the plastic strips.

SUMMARY OF THE INVENTION

In accordance with the present invention, a resilient deformable plastic molding strip is adhesively secured along an edge of a vehicle body, and resilient spring clips having a cross sectional configuration complementary to that of the molding strip are employed in conjunction with the adhesive layer at areas of high stress concentration to prevent failure of the adhesive bond and consequent progressive separation of the molding strip from the vehicle body.

It is, therefore, an object of the invention to mount a resilient protective and decorative molding strip along an edge of a vehicle body.

Another object of the invention is to permit mounting of such a strip along a curved path of relatively sharp curvature.

Another object of the invention is to provide a means for mounting such a protective and decorative strip without perforating the sheet material of the vehicle body.

Still another object of the invention is to provide a system for adhesively mounting such a molding strip having a resilient shock absorbing layer interposed between the strip and supporting surface.

Yet another object is to provide supplementary positive mechanical securement for such an adhesively mounted strip at points of high stress concentration.

Other objects and advantages will become more apparent during the course of the following description, when taken in connection with the accompanying drawings.

BRIEF DESCRIPTION OF THE DRAWINGS

In the drawings, wherein like numerals refer to like parts throughout;

FIG. 1 is a side view of the front portion of an automobile showing a resilient decorative and protective molding strip outlining the wheel opening in accordance with the invention;

FIG. 2 is an enlarged, fragmentary, perspective view of a portion of the vehicle body and wheel opening illustrating the manner of attachment of one form of the molding strip;

FIG. 3 is a sectional view through the molding strip and body edge, taken substantially along line 3—3 of FIG. 2; and FIG. 4 is a perspective view of one form of spring clip in accordance with the invention.

DESCRIPTION OF THE INVENTION

Referring now to the drawings, there is illustrated generally in FIG. 1 the forward portion of an automobile 10 embodying the invention. More particularly, the automobile includes a body 11 conventionally formed of sheet metal fabricated to provide the desired appearance. In order to reduce the weight of the vehicle, the trend recently has been to substitute lighter weight material such as plastic and glass fiber materials for sheet metal where feasible, and it is contemplated that the invention will find general utility with body segments formed of any such materials. The body 11 includes a fender 12 within which is positioned a wheel 13. In order to permit the wheel to pivot about a vertical axis for steering the vehicle as well as to provide access for changing the wheel and tire when necessary, the fender is conventionally provided with a curved wheel well opening 14. Body side molding strips as shown generally at 15 and as disclosed, for example, in the aforementioned United States patents, may extend longitudinally along the body 11, including the fender 12, for both decorative and protective purposes. Likewise, an appropriate bottom molding strip 16 may be provided along the lower extremity of the body.

Outlining the curved wheel well opening 14 is a decorative and protective strip 17 of a resilient, flexible material. As best shown in FIGS. 2 and 3, for purposes of artistic design as well as rigidity, in forming the wheel well opening in the fender 12 the edge portion of the sheet material 18 from which the fender is fabricated may be flared outwardly and then bent inwardly to create a perpendicularly extending flange 19. The wheel well strip 17 is generally of a configuration to fit around the external corner and along the surface of the flange.

More particularly, the wheel well strip may be formed of a resilient flexible material such as any one of various well known plastics as by conventional extruding techniques. As best illustrated in FIG. 3, the strip is generally L-shaped in cross-section with a main body portion 20 adapted to lie along the exterior surface of the fender and a transverse leg 21 extending along the surface of the flange 19. A bulbous rib 22 projecting outwardly from the main body portion 20 provides a decorative offset and assists in securing the strip in place as will be hereinafter explained. An adhered film layer 23, for example of metallized polyethylene terephthalate, may be provided on a portion of the molding strip in the well known manner to give it a metallic appearance. The bulbous rib 22 additionally protects the bright film layer 23 against impact from stones and from doors of adjacent vehicles.

In accordance with the invention, as best shown in FIG. 3, the molding strip is provided throughout its length on the rear surface of the main body portion 20 with a pressure sensitive adhesive layer 24. The adhesive layer may advantageously include a resilient elastic material capable of absorbing and dissipating vibrations from the fender sheet material 18 as taught by the aforementioned U.S. Pat. No. 3,439,950. To this end, a commercially available double-faced foam tape may be employed as the adhesive layer 24.

The strip 17 is sufficiently flexible and resilient, due to the nature of the material from which it is fabricated, that it can be deflected to follow the curved outline of the wheel opening 14. The adhesive layer 24 thus engages the outer face of the fender sheet material 18 to affix the strip to the fender 12, with the main body portion 20 lying along the outer surface and the leg 21 engaging the flange 19.

While the adhesive layer 24 is very effective in mounting such strips, excessive concentration of stresses in certain areas during operation of the vehicle may eventually cause the adhesive to fail and the strip to begin separating from the sheet material in those areas. Once separation begins, the area of stress concentration follows the line of adhesive failure and separation progresses. Such areas of stress concentration occur primarily at the ends of the strip although, depending upon the configuration of the wheel opening and fender edge, they might occur elsewhere.

In order to secure the adhesive layer against initial separation and prevent progression should initial separation occur, spring clips 25 are employed with the strip 17 in areas of high stress. Thus, there is provided a combined adhesive and compressive effect in these areas which holds the strip securely in place without requiring perforation of the underlying sheet material 18. As will be clearly apparent in FIGS. 3 and 4, the spring clip 25 is formed of a suitable thin sheet material such as spring steel or plastic, and has a configuration conforming generally to the molding strip and flange 19 and a compatible color so as to relatively unobtrusive when in place.

To this end the clip may comprise a main body portion 26 having an arcuate end 27 conforming to the configuration of the molding strip for hooking over the bulbous rib 22 thereof. At the opposite end of the main body portion there is provided a curved segment 28 adapted to engage behind the flange 19 and from which extends a spring arm 29 adapted to engage the rear surface of the fender sheet material 18. The spring clip thus urges the body portion 20 and adhesive layer 24 into engagement with the fender sheet material 18 and the leg 21 against the flange 19, thereby cooperating with the adhesive layer to secure the wheel well strip against separation from the fender. It will be readily apparent that the spring clip might take any of various forms dictated by the configuration of the molding strip and associated vehicle edge flange, and might as well be employed at other locations such as in conjunction with the bottom molding strip 16.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

I claim:

1. A decorative and protective ornamentation upon an automotive vehicle body, comprising an elongated molding strip extending along an edge of the sheet material forming said body and including a main body portion, a first surface on said main body portion adapted to face a corresponding surface of said vehicle body, means adhesively securing said molding strip throughout its length to said vehicle surface, a second surface on said main body portion opposite said first surface and including a bulbous rib projecting outwardly thereof, and a spring clip having an arcuate portion of complementary configuration hooked over said bulbous rib and engaging said vehicle body at at least one selected location along said strip, said clip urging said corresponding surfaces together and preventing failure of said adhesive securing means and separation of said molding strip from said vehicle surface due to excessive stresses at said location.

2. A decorative and protective ornamentation upon an automotive vehicle body as claimed in claim 1, wherein said strip extends along a curved edge defining a wheel well opening of said vehicle, and including one of said spring clips located adjacent each end of said strip.

* * * * *